United States Patent [19]

Lagasse

[11] Patent Number: 5,388,656

[45] Date of Patent: Feb. 14, 1995

[54] ENDLESS BELT TRACTION DEVICE FOR VEHICLES

[76] Inventor: Richard Lagasse, P.O. Box 117, Stockholm, Me. 04783

[21] Appl. No.: 216,775

[22] Filed: Mar. 23, 1994

Related U.S. Application Data

[63] Continuation of Ser. No. 20,341, Feb. 19, 1993, abandoned.

[51] Int. Cl.6 ............................................. B62D 55/04
[52] U.S. Cl. ................................. 180/9.21; 180/9.26
[58] Field of Search ............... 180/9.1, 9.21, 9.26, 180/9.28, 9.3, 9.34, 9.38, 9.44, 9.46; 305/15, 29, 32

[56] References Cited

U.S. PATENT DOCUMENTS

| | | | |
|---|---|---|---|
| 1,449,036 | 3/1923 | Feden | 180/9.26 |
| 1,774,835 | 9/1930 | Lombard | 305/32 |
| 2,587,813 | 3/1952 | Bombardier | 305/29 |
| 3,561,825 | 2/1971 | Gibson et al. | 305/20 |
| 3,606,496 | 9/1971 | Haycock | 305/29 |
| 3,860,080 | 1/1975 | Firstenberg | 180/9.1 |

FOREIGN PATENT DOCUMENTS

| | | | |
|---|---|---|---|
| 2375082 | 8/1978 | France | 305/15 |
| 0316187 | 7/1918 | Germany | 180/9.28 |

*Primary Examiner*—Kenneth R. Rice
*Assistant Examiner*—Victor E. Johnson
*Attorney, Agent, or Firm*—Frederick R. Cantor

[57] ABSTRACT

A traction unit for the road wheel of a farm tractor, or an analogous vehicle, that includes two idler wheels, located near the front and rear surfaces of the road wheel tire, and an endless flexible belt, trained around the three wheels. Each idler wheel has a pneumatic tire, located in the same plane as the vehicle tire, so that the three tires track along the midplane of the belt. The idler wheels are mounted on a tubular beam, that is rockably suspended from an axle member aligned with the road wheel axle, such that the belt lies essentially flat on the terrain surface, in spite of variations in terrain slope, or contour. The traction unit gives the vehicle added mobility in snow, sand, and other soft terrain.

1 Claim, 2 Drawing Sheets

ENDLESS BELT TRACTION DEVICE FOR VEHICLES

This application is a continuation of application Ser. No. 08/020,341, filed Feb. 19, 1993, now abandoned.

BACKGROUND OF THE PRESENT INVENTION

The present invention, relates to traction units for vehicles.

The present invention, more particulary, relates to a belt-type traction unit, trained around the tire of a farm tractor, or other vehicle, designed to increase the traction surface area in contact with the ground surface, thereby enabling the vehicle to move more easily on snow, sand, or other soft terrain, that normally prevents movement of conventional wheeled vehicles.

The present invention, most particularly, relates to vehicle motion in deep snow, although the principles of the present invention could also be applied to vehicles being operated in other types of terrain.

It is already known to increase the ground traction surface area of a vehicle tire, by running an endless belt traction unit around the tire, and auxiliary bogie wheels, or another tire.

U.S. Pat. No. 3,860,080, issued to Harold Firstenberg, on Jan. 14, 1975, shows an endless belt system, trained around a vehicle tire, and six auxiliary bogie wheels, located to the left, and to the right, of the tire, as seen in FIG. 1 of the patent. The system is believed to be overly complex, in that a relatively large number of bogie wheels is required.

Also, in the Firstenberg system, the belt mechanism is formed by four separate V-belts, interconnected by a series of transverse grouser bars, or cleats. Should the tension forces, or slack, differ appreciably in the different V-belts, the grouser bars will, inevitably, have skewed positions that can produce high angular loadings, and detachment of the bars, from the V-belts.

Further, in the Firstenberg system, the bogie wheels are located in planes, offset from the plane of the vehicle tire, such that the overall width of the system is, necessarily, rather large, i.e., almost four (4) times the tire width. Each bogie wheel has a V-shaped cross-section, for tracking on one of the V-belts. Should the V-groove in a wheel become clogged with dirt, debris, or .ice, the bogie wheel would, most likely, disconnect from the V-belt, or generate an abnormal tensile stress on the belt.

A further problem with the Firstenberg traction unit is that a relatively costly and complicated adjustment device is used, for controlling the slack, or tension, in the various V-belts. Two gear-like rollers are carried on swingable arms, for engagement with the transverse cleats that span the various V-belts. Tensioned cables extend from the swingable arms, around a central winch mechanism, such that manual rotational adjustment of the winch can, theoretically, be used to adjust the cable tension, and the forces exerted by the gear-like rollers, on the transverse cleats. The mechanism is seen to be rather cumbersome, costly, and prone to failure.

The present invention is directed to a belt-type traction unit, designed to be much simpler, and more rugged, than the unit disclosed in the Firstenberg patent.

U.S. Pat. No. 3,561,825, issued to D. Gibson, et al., on Feb. 9, 1971, discloses a belt-type traction unit formed by two laterally spaced flat belts and a large number of transverse grouser bars. The belt system is trained around two vehicle wheels, arranged in tandem, i.e., one behind the other. The tread surfaces on the vehicle tires engage the grouser bars, but, apparently, not the belts. The belts, apparently, only serve as connection devices for the ends of the grouser bars. The grouser bars are driven, in an endless path, by means of a rotary sprocket wheel, located above the belt system, midway between the two vehicle wheels.

The mechanism proposed in Gibson et al., appears to be usable, only with specialized vehicles, having tandem wheels, and a special drive sprocket, located midway between each pair of wheels. The Gibson et al., mechanism could not be used as an add-on traction unit with a conventional farm tractor, or other analogous conventional vehicle.

The present invention is concerned with a traction unit that can be added to a conventional farm tractor, in order to increase the tractor mobility in snow, or other soft terrain, e.g., sand or mud. The unit is intended to be installable, on a farm tractor without extensive redesign, or reconstruction of the tractor hardware.

SUMMARY OF THE PRESENT INVENTION

An object of the present invention is to provide a traction unit for vehicles.

Another object of the present invention is to provide a belt-type traction unit, trained around the tire of a farm tractor, or other vehicle, designed to increase the traction surface area in contact with the ground surface, thereby enabling the vehicle to move more easily on snow, sand, or other soft terrain, that normally prevents movement of conventional wheeled vehicles.

A further object of the present invention is, more particularly, to provide for vehicle motion in deep snow, although the principles of the present invention could also be applied to vehicles being operated in other types of terrain.

The present invention contemplates an add-on traction unit for the wheel of a conventional farm tractor, said traction unit comprising a horizontal beam that is swingably suspended from an axle unit, that can be attached to the hub area of the vehicle wheel, in alignment with the wheel rotational axis. At its opposite ends, the beam rotatably mounts two bogie wheels, that partially define the envelope formed by a single endless belt. Each bogie wheel comprises a pneumatic tire, located in a common plane with the vehicle tire, on which the traction unit is mounted. The tread surface of the three tires is engaged with the inner surface of the traction belt, such that the vehicle wheel provides the driving force for the belt. The bogie wheels act as idler wheels, to maintain the belt envelope.

The connecting beam between the two idler wheels will rock around the vehicle wheel axis, in accordance with terrain irregularities, positive or negative, whereby the belt is maintained in continuous driving contact with the terrain, i.e., snow, mud, sand, etc. Cleats are provided on the outer surface of the belt, in order to prevent slippage of the belt, relative to the terrain media.

The connecting beam between the two idler wheels is comprised of two telescopically connected tubes, arranged whereby one of the tubes can be slidably adjusted in the other tube, so as to control the slack in the belt. Belt slack can also adjusted, to some extent, by varying the tire pressure, i.e., the force exerted by the tire tread surfaces on the inner surface of the belt.

The principal advantages of the add-on unit are its relative simplicity and construction ruggedness.

A BRIEF DESCRIPTION OF THE DRAWINGS

FIG. 1, is taken along line 1—1, in FIG. 2.

DESCRIPTION OF THE PREFERRED EMBODIMENTS OF THE PRESENT INVENTION

Figure 1:
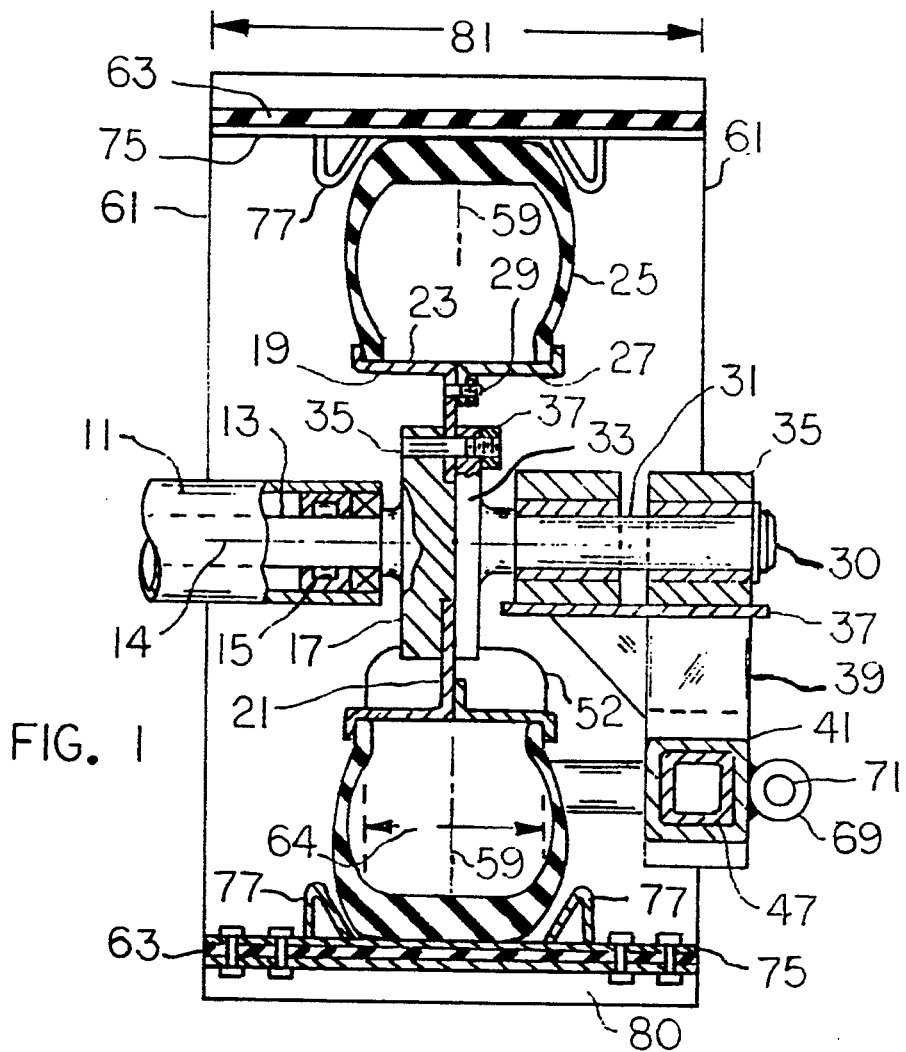
FIG. 1, is a sectional view, of a traction unit, embodying features of the present invention.

FIG. 1, is a sectional view, of a traction unit, embodying features of the present invention. FIG. 1, is taken along line 1—1 in FIG. 2.

FIG. 1, fragmentarily shows an axle housing, and one wheel of a conventional farm tractor. As shown, the axle includes a housing 11, for rotatably supporting a transverse rotary axle 13, via a needle bearing means 15. The outer end of the axle shaft, carries a hub plate 17, that can be used for attachment, of a conventional ground wheel 19, to the axle 13.

Wheel 19, comprises a central disk 21, having a rim member 23, thereon, for mounting the pneumatic tire 25. A detachable rim member 27, is attached to disk 21, by a ring of bolts 29, for retention of the tire 25, in an operating position, on the wheel 19. Axle 13, is a live, or powered, axle, so that during normal operation of the tractor, wheel 19, serves as a drive wheel for the tractor.

Some tractors have four (4) drive wheels, whereas other tractors have only two (2) drive wheels, usually the two rear wheels. The present invention discloses a traction unit, installable on each of the four (4) wheels, in the case of a four-wheel drive tractor, or on each of the two (2) wheels, in the case of a two-wheel drive tractor. The present invention finds the greatest utility in a four-wheel drive tractor, since the greatest mobility is achieved when all four wheels are equipped with the belt-type traction units of the present invention.

As representatively shown in the drawings, the traction unit comprises an axle means, generally designated by numeral 30. The illustrated axle means 30, includes a shaft 31, having a mounting plate 33, for attaching the shaft 31, to wheel hub 17, via a ring of studs 35. These studs 35, are pre-existing studs used to attach the hub 17, to wheel disk 21. Nuts 37, are threaded onto studs 35, to attach plate 33, to base plate 17, whereby shaft 31, is aligned with the axle 13 axis, i.e., the rotational axis 14, of the ground wheel 19.

Figure 2:
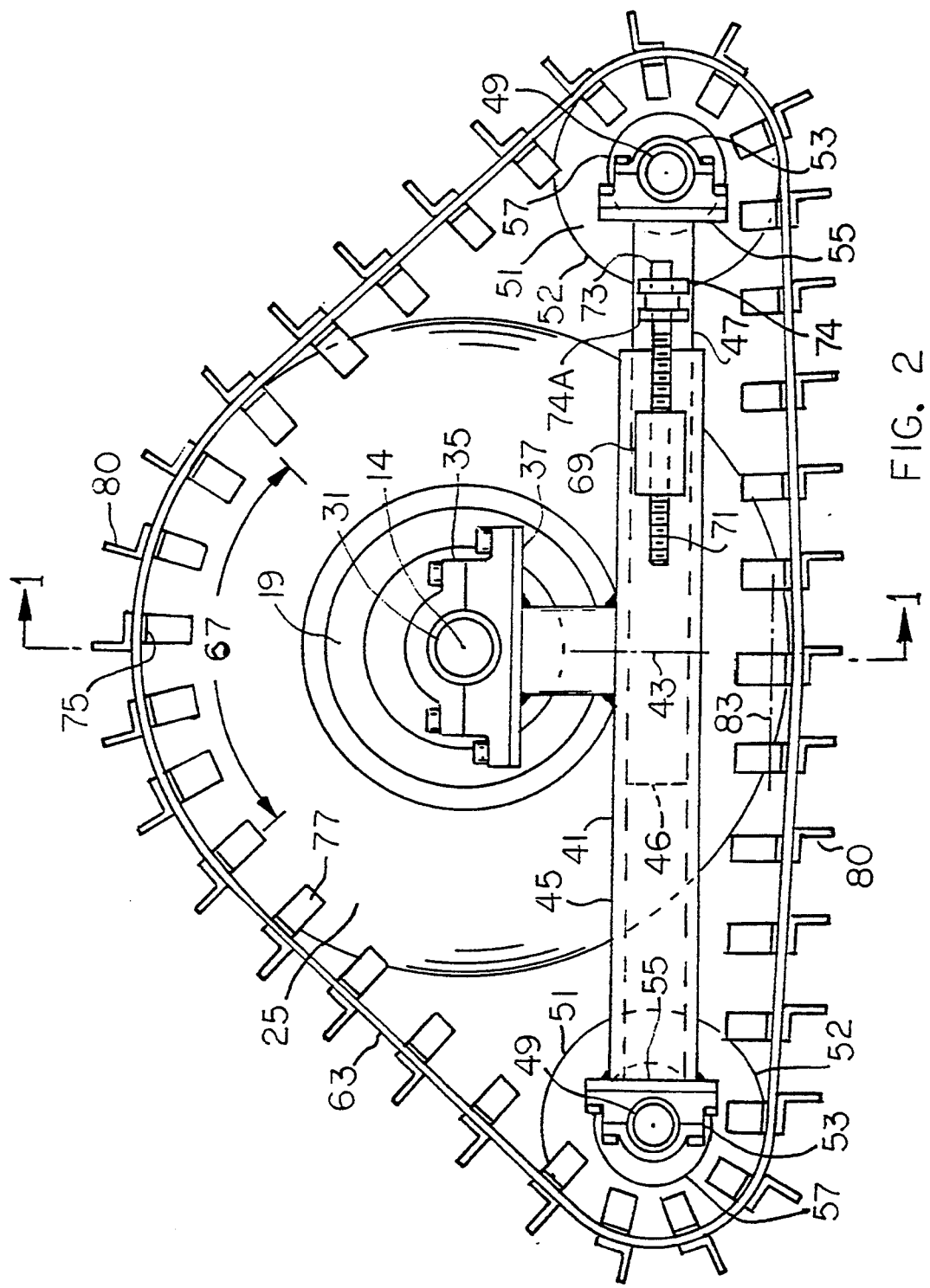
FIG. 2, is a right-side elevational view, of the traction unit, shown in FIG. 1.

FIG. 2, is a right-side elevational view, of the traction unit, shown in FIG. 1.

Two conventional pillow-block bearing units 35, are hung on shaft 31, for swingably suspending a horizontal beam 41, in the space below the shaft 31. The two bearing units 35, are carried on a flat plate 37, that is welded, or otherwise attached, to a vertical post 39. In the illustrated construction, post 39, is a square cross-sectioned tube, although other structural post 39, configurations can be used. An elongated horizontal beam 41, is welded to the lower end of post 39, with said beam 41, extending in opposite directions from an imaginary vertical plane 43, coincident with the axis 14, of axle shaft 31.

Beam 41, comprises a first main elongated tubular beam element 45, and a second elongated tubular beam element 47, telescopically extending into beam element 45. In FIG. 2, the left end of beam element 47, is indicated by numeral 46. Tubular beam element 47, has a significant portion of its total length, telescopically fitting within the tubular beam member 45, so that the two-piece tubular beam 41, has essentially the same rigidity, and strength, as a correspondingly dimensioned one-piece tubular beam. The tubular beam elements have square, or rectangular, cross-sections, such that the beam member 47, is slidably keyed to beam member 45.

A horizontal shaft 49, extends transverse to the two-piece beam 41, at its opposite ends, so as to mount an idler wheel 51, in the spaces behind the beam ends. The idler wheels 51, are similarly sized and constructed. Each shaft 49, has one end thereof, rotatably fitting within a conventional pillow-block bearing 53, at an end of beam 41. A vertical plate 55, is attached to each end of the beam 41, to mount the associated bearing 53. Each shaft 49, has its other end attached to a wheel disk 57, that is bolted to the associated wheel 51, in a fashion analogous to the stud attachment system, shown at 35 and 37, in FIG. 1. Each idler wheel 51, has, or includes, a pneumatic tire 52, constructed similarly to tire 25, although having a much smaller diameter.

In an alternate arrangement, each idler wheel 51, could be mounted on a beam 41, with the wheel shaft 49, affixed to the end of the beam 41, as by welding. In that case, the bearing 53, for each wheel 51, would be located within the wheel hub, rather than at the end of beam 41.

As shown in FIG. 1, each idler wheel 51, is located in the same rotational plane as the vehicle ground wheel 19, such that the common mid-plane 59, for the three wheels is equidistant from the side edges 61, of an endless flexible belt 63, that is trained around the peripheral edge areas of the tires for the three wheels. The tread areas of the three tires track the belt 63, on a common plane midway between the belt 63, side edges.

As seen in FIG. 1, the axial width dimension 64, of each idler wheel 51, is less than the axial width dimension of ground wheel 19, such that the belt 63, is prevented from sidewise dislocation, by means of guide shoes 77, engageable only with side surfaces of tire 25. The guide shoes, normally do not engage the side surfaces of tires 52.

As viewed in FIG. 2, an upper surface area of the tire 25, has a substantial portion of its circumference engaged with belt 63, as indicated by the imaginary arc 67. Typically, the arcuate tire-belt contact area, is about ninety (90) degrees, measured around the wheel axis 14. The ground wheel 19, has extensive arcuate contact with the belt 63, sufficient to prevent any slippage between the powered wheel 19, and the belt 63, inner surface.

The tread area of tire 25, is also in pressure engagement with the belt 63, at a point directly below the wheel rotational axis 14. The tire 25, therefore, has two separate portions of its tread area in driving engagement with the belt 63, inner surface, such that any tendency of the belt 63, to slip, relative to the tire 25, is greatly minimized.

Belt 63, is controlled, as to slack and tension, by an adjustment means, that holds the two tubular beam elements 45 and 47, in selected positions of telescopic adjustment. The holding means, comprises, an elongated tubular nut 69, welded, or otherwise attached, to the flat front face of tubular beam element 45, and a rotary screw 71, mounted on the front face of tubular beam element 47. The screw 71, has a cylindrical head 73, extending through a circular opening in a lug 74, that extends forwardly, from the face of the beam element 47. The threaded area of the screw 71, meshes with the internal thread surface in nut 69. Two lugs 74 and 74A, retain the screw against axial dislocation.

Head 73, of the screw 71, has a hex-socket therein, whereby the screw can be turned, to telescopically move beam element 47, into, or out of, beam element 45, thereby adjusting the tension generated in belt 63. Some control of the belt tension, can also be realized by varying the inflation pressure in one, or all, of the tires 25, 52, and 52.

Figure 3:
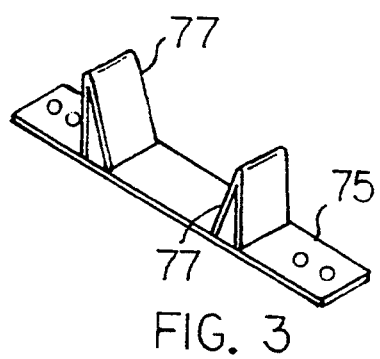
FIG. 3, is a perspective view, of a guide shoe unit, that can be used, in the FIG. 1 traction unit.

FIG. 3, is a perspective view, of a guide shoe unit, that can be used, in the FIG. 1 traction unit.

The inner surface of belt 63, carries thereon, a plurality of rectangular metal plates 75. Each metal plate 75, extends the full width dimension of the belt 63. Two V-shaped guide shoes 77, are welded, or otherwise attached, to each plate 75, equidistant from the plate 75, midpoint. The guide shoes 77, are also equidistant from an imaginary midplane 59, of the three wheels, and belt 63, such that the shoes 77, prevent excessive sidewise dislocation of the belt 63, from the ground wheel 19. Due to the fact that the width dimension 64, of each idler wheel 51, is less than the corresponding width dimension of wheel 19, the shoes 77, do not ordinarily come into contact with the side surfaces of tires 52, on wheels 51.

The guide shoes 77, form two rows of shoes, extending along the side planes of tire 25, whereby the shoes 77, prevent sidewise dislocation of the belt 63, in either direction, i.e., left or right, in FIG. 1. Each rectangular plate 75, acts as a connector, and mounting means, for two guide shoes 77. The plates 75, are, therefore, sometimes hereinafter referred to as shoe connector plates 75. The central portions of plates 75, between guide shoes 77, project from the belt 63, inner surface, so as to have gripping contact with the tread surface of the tire 25, thereby promoting a non-slip drive from the tire 25, to the belt 63.

A number of traction bars 80, extend transversely across the outer surface of belt 63, at regularly spaced points therealong. Each traction bar 80, can be an angle iron, wherein each leg of the angle is about two inches long in the cross-sectional direction. The wall thickness of the angle iron can be about one-quarter inch. The spacing of the angle-iron shaped traction bars 80, is the same as the spacing of the aforementioned shoe connector plates 75, so that individual traction bars 80, are aligned with the individual shoe connector plates 75, on opposite surfaces of belt 63. The traction bars 80, and shoe connector plates 75, are connected together by means of bolts that extend through the bar and plate walls, as well as the intervening belt 63, material. The belt material can have holes prepunched at regularly spaced points therealong, whereby the traction bars 80, and shoe connector plates 75, are evenly spaced and properly oriented, transverse to the belt 63, longitudinal axis.

The bolt connections, between the shoe connector plates 75, and the traction bars 80, serve to clamp the plates 75, and bars 80, to the belt 63 surface, such that the plates 75, and bars 80, mutually reinforce one another, whereby the belt 63, is appreciably stiffened, in the transverse direction. The belt 63, can flex in the longitudinal direction, as necessary to bend around the tread areas of the three (3) tires, 25, 52, and 52. However, the transverse stiffening action of the bars 80, and the plates 75, causes the belt to be stiff, i.e., non-bendable, in the transverse direction. The spacing of bars 80, and plates 75, is such that the belt 63 lower run, can twist torsionally around the belt 63 longitudinal axis.

Belt 63, can have a range of different width dimensions, while performing its function as a terrain traction mechanism. However, typically, the width dimension 81, of the belt 63, will be about twenty-two (22) inches. Depending on the size of the vehicle tire 25, each guide shoe 77, will usually be spaced inwardly from the side edge 61, of the belt about six (6) or seven (7) inches.

A traction unit, constructed as shown in the drawings, can be mounted on each powered wheel of the tractor, or other vehicle. Each traction unit appreciably increases the footprint area of the traction mechanism, thereby enhancing the mobility of the vehicle in soft terrain, e.g., snow, sand, or mud. A primary contemplated use of the traction unit, is on a farm tractor, whereby the tractor can be used for grooming snow surfaces on snowmobile trails, or on ski slopes. The tractor can readily climb steep slopes, or move cross-country, over ice, brush, and logs that would ordinarily hamper conventional wheeled vehicles. The rockable mounting of beam 41, around the axis of shaft 31, enables the idler wheels 51, to conform to terrain irregularities, whereby the traction unit seats, essentially, flatwise on the terrain, in spite of variances in the terrain inclination.

Each traction unit can be installed on a non-steerable, i.e., fixed axle, wheel, or an a steerable wheel. In order, to minimize the difficulty of turning, or steering, a wheel having the increased traction area, the diameter of each idler wheel 51, is chosen so that the vehicle weight is transmitted primarily through the vehicle wheel 19, and to a lesser extent, through each idler wheel 51. The vehicle wheel 19, can thus pivot around its normal pivot axis, without undue frictional interference by the terrain, acting against the traction bars 80. The traction bars 80, will scrape into the terrain media, during a turning maneuver.

The traction unit is designed so that when the traction unit is in an upright condition, spaced above the terrain surface, the lower edge surface of vehicle road wheel 19, is slightly below a horizontal plane, taken through the lower edge surfaces, of idler wheels 51. As viewed in FIG. 2, the imaginary reference plane through the lower edges of wheels 51, is indicated by dashed line 83. The reference plane is slightly above the lower edge of road wheel 19, i.e., typically, the height difference is one or two inches. When the traction unit is in an operating position on soft terrain, the belt 63, will be tractively engaged with the terrain along, substantially, the entire belt 63 length, between shafts 49. However, the terrain pressure will be heaviest directly under wheel 19, whereby the wheel 19, can be steered without excessive resistance, due to the belt-terrain frictional engagement.

Each idler wheel 51, has a diameter that is appreciably smaller than the diameter of vehicle wheel 19, whereby the overall length of the traction unit is kept reasonably small, consistent with the clearance requirements between the front and rear wheels of conventional tractors. In conventional tractors, the two rear wheels are spaced a relatively short distance behind the front wheels, i.e., tractors have a relatively short wheel base. If each traction unit is relatively long, the traction units on the front and rear wheels, will interfere with each other. By using relatively small diameter idler wheels 51 and small clearance distances between the wheels the overall length of each traction unit can be kept reasonably small, thereby avoiding clearance problems, between the front and rear wheel traction units. As shown in FIG. 2, the clearance distance between the tread surface on tire 25 and the tread surface on each idler wheel tire 52 is less than the radius of each idler wheel tire; such small clearances minimize the overall length of the traction unit, thereby facilitating the use of the traction units on the front and rear wheels of conventional tractors.

The present invention describes an endless belt traction unit that can be mounted onto a conventional farm tractor, or other vehicle, in order to increase the mobility of the vehicle when used on soft terrain, i.e., snow, sand, or mud. Features of the present invention are recited in the appended claims. The drawings contained herein necessarily depict specific structural features and embodiments of the tractor traction unit, useful in the practice of the present invention.

However, it will be appreciated by those skilled in the arts pertaining thereto, that the present invention can be practiced in various alternate forms and configurations. Further, the previously detailed descriptions of the preferred embodiments of the present invention, are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A traction unit for attachment to a pre-existing road wheel of a vehicle, wherein said road wheel comprises an axle and a pneumatic tire having a tread surface rotatable around an axle defined by said axis;
   said traction unit comprising an axle means connected to said vehicle road wheel so that said axle means is aligned with said road wheel axis;
   a normally horizontal rigid beam assembly having first and second ends, said rigid beam assembly being located below said axle means so that said beam assembly extends in opposite directions from a vertical plane coincident with the axle means axis;
   a first idler wheel rotatably mounted on said first end of said beam assembly;
   a second idler wheel rotatably mounted on said second end of said beam assembly;
   each idler wheel comprising a shaft and a pneumatic tire having a tread surface rotatable around the shaft axis;
   said first and second idler wheels being the only idler wheels in the traction unit;
   a suspension post extending downwardly and swivably mounted on said axle means for rotatably suspending said beam assembly below said axle means so that said beam assembly and said idler wheels are rockable as a unit around said road wheel rotational axis;
   a single endless flexible ground traction belt trained around the tires on said road wheel and said first and second idler wheels;
   said beam assembly comprising an elongated tube having a non-circular cross section, and a beam element (47) having a non-circular cross section slidably telescoped into said elongated tube;
   said beam element being slidably adjustable in said elongated tube for controlling slack in said belt;
   the diameter of each idler wheel being such that when said traction unit is in an upright condition spaced above a flat horizontal ground surface, the lower surface of the vehicle road wheel is slightly below the lower surfaces of said idler wheels, whereby during service the ground pressure on said belt is distributed to a greater extent on the belt area below the vehicle road wheel axle, and to a lesser extent on the belt areas below the idler wheel shafts;
   each idler wheel shaft extending from said beam assembly so that the idler wheel tires and the road wheel tire track in a common plane;
   said ground traction belt having side edges spaced equidistant from the common track plane of the pneumatic tires;
   said ground traction belt having an inner surface engaged with the tread surfaces of said pneumatic tires and an outer surface presented to the ground;
   two rows of guide shoes extending from the belt inner surface equidistant from the road wheel track plane in close proximity to the road wheel tire to prevent sidewise dislocation of said belt from the vehicle road wheel; and
   the tread surface on the road wheel tire being spaced from the tread surface on each idler wheel by a clearance distance that is less than the radius of each idler wheel tire in order to minimize the overall length of the traction unit.

* * * * *